United States Patent
Nishimura et al.

(10) Patent No.: US 11,022,837 B2
(45) Date of Patent: Jun. 1, 2021

(54) OPTICAL FILM AND LIQUID CRYSTAL DISPLAY DEVICE

(71) Applicant: FUJIFILM Corporation, Tokyo (JP)

(72) Inventors: Naoya Nishimura, Kanagawa (JP); Jun Takeda, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 205 days.

(21) Appl. No.: 16/391,875

(22) Filed: Apr. 23, 2019

(65) Prior Publication Data

US 2019/0250457 A1    Aug. 15, 2019

Related U.S. Application Data

(63) Continuation of application No. PCT/JP2017/039424, filed on Oct. 31, 2017.

(30) Foreign Application Priority Data

Oct. 31, 2016  (JP) .............................. JP2016-212558

(51) Int. Cl.
| | |
|---|---|
| *G02F 1/13* | (2006.01) |
| *G02F 1/1335* | (2006.01) |
| *G02B 5/30* | (2006.01) |
| *B32B 27/30* | (2006.01) |
| *B32B 7/023* | (2019.01) |
| *G02F 1/1337* | (2006.01) |
| *G02F 1/13363* | (2006.01) |

(52) U.S. Cl.
CPC ........ *G02F 1/133528* (2013.01); *B32B 7/023* (2019.01); *B32B 27/306* (2013.01); *G02B 5/305* (2013.01); *G02F 1/133502* (2013.01); *G02F 1/133634* (2013.01); *G02F 1/133711* (2013.01); *B32B 2329/04* (2013.01); *G02F 1/133531* (2021.01); *G02F 1/133633* (2021.01); *G02F 2201/08* (2013.01); *G02F 2201/50* (2013.01); *G02F 2202/043* (2013.01)

(58) Field of Classification Search
CPC ........ G02F 1/133528; G02F 1/133633; G02F 1/133634; G02F 1/133502; G02F 2201/08; G02F 2201/50; G02F 2202/043
See application file for complete search history.

(56) References Cited

U.S. PATENT DOCUMENTS

| | | |
|---|---|---|
| 6,025,958 A | 2/2000 | Yamaoka et al. |
| 2002/0075428 A1 | 6/2002 | Saiki et al. |
| 2010/0092784 A1 | 4/2010 | Kamada et al. |
| 2015/0029445 A1 | 1/2015 | Takeda et al. |
| 2016/0041320 A1 | 2/2016 | Kobayashi |
| 2019/0094626 A1 | 3/2019 | Yanai |

FOREIGN PATENT DOCUMENTS

| | | | | |
|---|---|---|---|---|
| CN | 101080662 A | * | 11/2007 | ......... G02F 1/13362 |
| JP | 09-80231 A | | 3/1997 | |
| JP | 11-149015 A | | 6/1999 | |
| JP | 2002-202412 A | | 7/2002 | |
| JP | 2005-215435 A | | 8/2005 | |
| JP | 2008-165201 A | | 7/2008 | |
| JP | 2008275976 A | | 11/2008 | |
| JP | 2009145776 A | | 7/2009 | |
| JP | 2010150513 A | | 7/2010 | |
| JP | 4902516 B2 | | 3/2012 | |
| JP | 2013160775 A | | 8/2013 | |
| JP | 2015-043073 A | | 3/2015 | |
| JP | 2016027387 A | | 2/2016 | |
| JP | 2016-105127 A | | 6/2016 | |
| JP | 2016139133 A | | 8/2016 | |
| WO | 2014/168258 A1 | | 10/2014 | |
| WO | 2017/208617 A1 | | 12/2017 | |

OTHER PUBLICATIONS

International Search Report Issued in PCT/JP2017/039424 dated Jan. 9, 2018.
Written Opinion Issued in PCT/JP2017/039424 dated Jan. 9, 2018.
International Preliminary Report on Patentability Issued in PCT/JP2017/039424 dated Apr. 30, 2019.
Office Action, issued by the Japanese Patent Office dated Mar. 24, 2020, in connection with Japanese Patent Application No. 2018-547233.
Office Action, issued by the Japanese Patent Office dated Jul. 21, 2020, in connection with Japanese Patent Application No. 2018-547233.

* cited by examiner

*Primary Examiner* — Paisley L Wilson
(74) *Attorney, Agent, or Firm* — Edwards Neils LLC; Jean C. Edwards, Esq.

(57) ABSTRACT

The present invention provides an optical film which has excellent light resistance and durability, while being suppressed in the occurrence of internal reflection and a liquid crystal display device. An optical film according to the present invention includes a light absorption anisotropic layer having at least one dichroic dye compound, and a protective layer that is adjacent to the light absorption anisotropic layer, and the light absorption anisotropic layer and the protective layer satisfy a specific relational expression.

20 Claims, No Drawings

OPTICAL FILM AND LIQUID CRYSTAL DISPLAY DEVICE

CROSS-REFERENCE TO RELATED APPLICATIONS

This application is a Continuation of PCT International Application No. PCT/JP2017/039424 filed on Oct. 31, 2017, which was published under PCT Article 21(2) in Japanese, and which claims priority under 35 U.S.C. § 119(a) to Japanese Patent Application No. 2016-212558 filed on Oct. 31, 2016. The above applications are hereby expressly incorporated by reference, in their entirety, into the present application.

BACKGROUND OF THE INVENTION

1. Field of the Invention

The present invention relates to an optical film and a liquid crystal display device.

2. Description of the Related Art

A technology of using a light absorption anisotropic layer having an absorption axis in the thickness direction is known for peep prevention and viewing angle control for a liquid crystal display device. For example, JP4902516B proposes a polarizing element related to a viewing angle control system using a film containing a dichroic substance and having an angle formed between an absorption axis and a normal to the film surface of 00 to 45°.

SUMMARY OF THE INVENTION

In recent years, the required performance required for optical films has been increased, and specifically, optical films excellent in light resistance and durability are required.

As a result of investigations on the light resistance and durability of an optical film having a light absorption anisotropic layer including a dichroic dye compound, and a protective layer laminated on the light absorption anisotropic layer through an adhesive with reference to the description of JP4902516B, the present inventors have found that, depending on the kind of the light absorption anisotropic layer, the light resistance may be deteriorated in some cases. Further, the present inventors have found that the internal reflection of the optical film may become high in some cases.

An object of the present invention is to provide an optical film which has excellent light resistance and durability, while being suppressed in the occurrence of internal reflection, and a liquid crystal display device.

The present inventors have found that as long as an optical film in which a light absorption anisotropic layer in which in-plane and thickness direction refractive indices satisfy a predetermined relationship is used, the refractive index in the thickness direction of the light absorption anisotropic layer is equal to or more than a predetermined value, the refractive indices of the light absorption anisotropic layer and a protective layer satisfy a predetermined relationship, and the light absorption anisotropic layer and the protective layer are arranged to be adjacent to each other is used, the light resistance and the durability are excellent and the occurrence of internal reflection can be suppressed, and thus have completed the present invention.

That is, it has been found that the above object can be achieved by adopting the following configurations.

[1] An optical film comprising: a light absorption anisotropic layer having at least one dichroic dye compound; and a protective layer that is adjacent to the light absorption anisotropic layer, in which the light absorption anisotropic layer and the protective layer satisfy Expressions (1) to (4), $$-0.2 \leq (nx+ny)/2 - n \leq 0.2 \tag{1}$$

$$nz > 1.7 \tag{2}$$

$$nz > nx \tag{3}$$

$$nz > ny \tag{4}$$

in the expressions, n represents a refractive index of the protective layer, nx represents a refractive index in a plane of the light absorption anisotropic layer in a refractive index maximum direction, ny represents a refractive index in the plane of the light absorption anisotropic layer in a direction orthogonal to nx, and nz represents a refractive index in a thickness direction of the light absorption anisotropic layer.

[2] The optical film according to [1], in which the nz is 1.85 or more.

[3] The optical film according to [1] or [2], in which the protective layer includes a polyvinyl alcohol-based resin.

[4] The optical film according to [1] or [2], in which the protective layer is a layer formed by curing a composition having an acrylate monomer.

[5] The optical film according to any one of [1] to [4], in which the protective layer has an oxygen permeation coefficient of 5 ccmm/m$^2$·day·atm or less.

[6] The optical film according to any one of [1] to [5], in which the protective layer has a Knoop hardness of 160 N/mm$^2$ or more.

[7] The optical film according to any one of [1] to [6], further comprising: a transparent base material film on a side of the light absorption anisotropic layer opposite to the protective layer.

[8] The optical film according to [7], in which the transparent base material film is a cellulose acylate film.

[9] The optical film according to [7] or [8], further comprising: an alignment film between the transparent base material film and the light absorption anisotropic layer.

[10] The optical film according to [9], in which the alignment film includes a polyvinyl alcohol-based resin.

[11] The optical film according to any one of [1] to [10], in which the light absorption anisotropic layer includes a polymer liquid crystal compound.

[12] The optical film according to [11], in which the polymer liquid crystal compound forms a nematic liquid crystalline phase.

[13] The optical film according to any one of [1] to [12], in which the light absorption anisotropic layer is a layer obtained by using a composition including a compound containing an acrylate.

[14] A liquid crystal display device comprising, in order: the optical film according to any one of [1] to [13]; a polarizer; and a liquid crystal cell.

According to the present invention, it is possible to provide an optical film which has excellent light resistance and durability and is suppressed in the occurrence of internal reflection, and a liquid crystal display device.

DESCRIPTION OF THE PREFERRED EMBODIMENTS

Hereinafter, the present invention will be described in detail.

The description of the constitutional requirements described below is made on the basis of representative embodiments of the present invention, but it should not be construed that the present invention is limited to those embodiments.

In this specification, numerical value ranges expressed by the term "to" mean that the numerical values described before and after "to" are included as a lower limit and an upper limit, respectively.

In addition, in this specification, the term "polarizing plate" refers to a polarizing plate in which a polarizing plate protective layer or a functional layer is arranged on at least one surface of a polarizer, and a polarizer and a polarizing plate are separately used.

Further, in this specification, the terms "parallel" and "orthogonal" do not mean parallel or orthogonal in the strict meaning but mean a range of ±5° from parallel or orthogonal.

[Optical Film]

An optical film according to an embodiment of the present invention has a light absorption anisotropic layer having at least one dichroic dye compound, and a protective layer that is adjacent to the light absorption anisotropic layer, and the light absorption anisotropic layer and the protective layer satisfy Expressions (1) to (4).

$$-0.2 \leq (nx+ny)/2 - n \leq 0.2 \quad (1)$$

$$nz > 1.7 \quad (2)$$

$$nz > nx \quad (3)$$

$$nz > ny \quad (4)$$

Here, in the expressions, n represents a refractive index of the protective layer, nx represents a refractive index in the plane of the light absorption anisotropic layer in a refractive index maximum direction, ny represents a refractive index in the plane of the light absorption anisotropic layer in a direction orthogonal to nx, and nz represents a refractive index in the thickness direction of the light absorption anisotropic layer.

The optical film according to the embodiment of the present invention has excellent light resistance. This is assumed due to the following reason.

Since the light absorption anisotropic layer satisfies Expressions (3) and (4), the dichroic dye compound included in the light absorption anisotropic layer is aligned in the thickness direction of the light absorption anisotropic layer (that is, the dichroic dye compound is vertically aligned). Further, as long as the light absorption anisotropic layer satisfies Expression (2), that is, as long as the refractive index nz in the thickness direction has a large value, the dichroic dye compound is aligned in the thickness direction of the light absorption anisotropic layer with a high degree of alignment. In addition, it is considered that since the light absorption anisotropic layer and the protective layer are adjacent to each other (in other words, the light absorption anisotropic layer and the protective layer are in contact with each other), compared to a case where another layer such as an adhesive layer is present between these layers, the occurrence of alignment disorder in the light absorption anisotropic layer, and movement of the dichroic dye compound to another layer such as an adhesive layer can be suppressed.

In this manner, in a case where the dichroic dye compound is vertically aligned with a high degree of alignment, light emitted in a direction normal to optical film passes through the light absorption anisotropic layer and is not easily absorbed into the dichroic dye compound. As a result, it is considered that the photodecomposition of the dichroic dye compound in the light absorption anisotropic layer is suppressed and an optical film having excellent light resistance is thus obtained.

Further, it is considered that the light resistance is further improved due to a synergistic effect of an effect of improving light resistance by providing the protective layer and the above-described effect of improving light resistance.

In addition, according to the optical film of the embodiment of the present invention, it is possible to suppress the occurrence of internal reflection. This is assumed due to the following reason.

It is considered that since the light absorption anisotropic layer and the protective layer satisfy the relationship of Expression (1), a difference in refractive index at the interface between the light absorption anisotropic layer and the protective layer is reduced and thus the occurrence of internal reflection can be suppressed.

Here, as long as the dichroic dye compound is vertically aligned with a high degree of alignment, the refractive indices (nx and ny) of the light absorption anisotropic layer in the in-plane direction tend to decrease. As described above, in the optical film according to the embodiment of the present invention, the dichroic dye compound is vertically aligned with a high degree of alignment. Therefore, it is considered that the values of the refractive indices (nx and ny) of the light absorption anisotropic layer in the in-plane direction approach to the value of the refractive index (n) of the protective layer and thus the above value can be satisfied.

The optical film according to the embodiment of the present invention has excellent durability since the light absorption anisotropic layer is protected by the protective layer.

<Transparent Base Material Film>

It is preferable that the optical film according to the embodiment of the present invention has a transparent base material film.

The transparent base material film is preferably arranged on a surface of the light absorption anisotropic layer opposite to the surface on which the protective layer is provided.

As the transparent base material film, known transparent resin films, transparent resin plates, transparent resin sheets, and the like can be used, and there is no particular limitation. As the transparent resin films, a cellulose acylate film (for example, a cellulose triacetate film (refractive index: 1.48), a cellulose diacetate film, a cellulose acetate butyrate film, or a cellulose acetate propionate film), a polyethylene terephthalate film, a polyether sulfone film, a polyacrylic resin film, a polyurethane-based resin film, a polyester film, a polycarbonate film, a polysulfone film, a polyether film, a polymethylpentene film, a polyether ketone film, a (meth) acrylonitrile film, and the like can be used.

Among these, a cellulose acylate film generally used as a protective film for a polarizing plate is preferable and a cellulose triacetate film is particularly preferable since the film has a high transparency and a less optical birefringence and can be produced with ease.

The thickness of the transparent base material film is typically 20 μm to 100 μm.

In the present invention, it is particularly preferable that the transparent base material film is a cellulose ester-based film, and the film thickness thereof is 20 to 70 μm.

<Light Absorption Anisotropic Layer>

The light absorption anisotropic layer in the present invention is a layer satisfying Expressions (1) to (4) and having at least one dichroic dye compound. The light absorption anisotropic layer has an absorption axis in the thickness direction.

In Expression (2), the value of nz is more than 1.7 and from the viewpoint that the dichroic dye compound can be vertically aligned with a higher degree of alignment, the value of nz is preferably 1.85 or more.

The respective values of nx and ny are respectively preferably 1.40 to 1.60 and more preferably 1.45 to 1.55.

As a specific method for satisfying Expressions (2) to (4), there is a method of adjusting the kind and/or blending ratio of the components used for producing the light absorption anisotropic layer.

The component included in the light absorption anisotropic layer in the present invention is not particularly limited except that the dichroic dye compound is used. In the present invention, the term "dichroic dye compound" means a dye having different absorption wavelengths depending on the incident direction of incidence light on the dye molecule.

As a technology of aligning the dichroic dye compound in a desired direction, a technology of preparing a polarizer using a dichroic dye compound, a technology of preparing a guest-host type liquid crystal cell, and the like can be referred to. For example, the technology used in the method of producing a dichroic polarizing element described in JP2002-090526A, and the method of preparing a guest-host type liquid crystal device described in JP2002-099388A can also be used for preparing the light absorption anisotropic layer in the present invention.

Dichroic dye compounds can be classified into a dichroic dye compound having a rod-like molecular shape, and a dichroic dye compound having a disc-like molecular shape. Any of these dichroic dye compounds may be used in preparing the light absorption anisotropic layer in the present invention, but it is preferable to use a dichroic dye compound having a rod-like molecular shape.

Preferable examples of the dichroic dye compound having rod-like molecular shape include azo dyes, anthraquinone dyes, perylene dyes, and mericyanine dyes. Specifically, examples of azo dyes include those described in JP1999-172252A (JP-H11-172252A), examples of anthraquinone dyes include those described in JP1996-067822A (JP-H08-067822A), examples of perylene dyes include those described in JP1987-129380A (JP-S62-129380A), and examples of mericyanine dyes include those described in JP2002-241758A.

The dichroic dye compounds having rod-like molecular shape may be used alone or in combination of two or more kinds thereof.

Examples of the dichroic dye compound having a disc-like molecular shape include dichroic dyes which are used in an "E-Type polarizer" as a polarizer using a lyotropic liquid crystal, as represented by those of OPTIVA Inc. For example, materials described in JP2002-090547A are exemplified. In addition, there is an example using a bis-azo-based dichroic dye compound which utilizes a worm-like micelle type structure as a chemical structure of similarly absorbing light in a disc-like form, and materials described in JP2002-090526A are exemplified.

The dichroic dye compounds having a disc-like molecular shape may be used alone or in combinations of two or more kinds thereof.

For example, the light absorption anisotropic layer in the present invention can be prepared using a coloring composition including the dichroic dye compound.

The coloring composition may include components other than the dichroic dye compound, and examples thereof include a liquid crystal compound, a solvent, an interface improver, a polymerizable component, and a polymerization initiator (for example, a radical polymerization initiator). In this case, the light absorption anisotropic layer in the present invention includes solid components other than a liquid component (a solvent or the like).

The liquid crystal compound is a liquid crystal compound which does not exhibit dichroism.

As the liquid crystal compound, not only a low molecular weight liquid crystal compound but also a polymer liquid crystal compound can be used. Here, the term "low molecular weight liquid crystal compound" refers to a liquid crystal compound having no repeating unit in its chemical structure. The term "polymer liquid crystal compound" refers to a liquid crystal compound having a repeating unit in its chemical structure.

Examples of the low molecular weight liquid crystal compound include low molecular weight liquid crystal compounds described in JP2013-228706A.

Examples of the polymer liquid crystal compound include thermotropic liquid crystal polymers described in JP2011-237513A. In addition, the polymer liquid crystal compound may have a crosslinkable group (for example, an acryloyl group and a methacryloyl group) at the terminal.

The liquid crystal compounds may be used alone or in combination of two or more kinds thereof.

In a case where the liquid crystal compound is contained, the content of the liquid crystal compound is preferably 25 to 2000 parts by mass, more preferably 33 to 1000 parts by mass, and even more preferably 50 to 500 parts by mass with respect to 100 parts by mass of the content of dichroic dye compound in the coloring composition. By setting the content of the liquid crystal compound within the above range, the alignment degree of the light absorption anisotropic layer is further improved.

In a case where the light absorption anisotropic layer in the present invention includes the polymer liquid crystal compound, the polymer liquid crystal compound preferably forms a nematic liquid crystalline phase.

The temperature range exhibiting the nematic liquid crystalline phase is preferably room temperature (23° C.) to 450° C., and from the viewpoint of handling and production suitability, the temperature range is preferably 50° C. to 400° C.

Examples of the solvent include organic solvents such as ketones (for example, acetone, 2-butanone, methyl isobutyl ketone, cyclohexanone, and cyclopentanone), ethers (for example, dioxane, tetrahydrofuran, 2-methyl tetrahydrofuran, cyclopentyl methyl ether, tetrahydropyran, and dioxolane), aliphatic hydrocarbons (for example, hexane), alicyclic hydrocarbons (for example, cyclohexane), aromatic hydrocarbons (for example, benzene, toluene, xylene, and trimethylbenzene), halogenated carbons (for example, dichloromethane, trichloromethane, dichloroethane, dichlorobenzene, and chlorotoluene), esters (for example, methyl acetate, ethyl acetate, butyl acetate, and ethyl lactate), alcohols (for example, ethanol, isopropanol, butanol, cyclohexanol, isopentyl alcohol, neopentyl alcohol, diacetone alcohol, and benzyl alcohol), cellosolves (for example, methyl cellosolve, ethyl cellosolve, and 1,2-dimethoxyethane), cellosolve acetates, sulfoxides (for example, dimethylsulfoxide), amides (for example, dimethylformamide, dimethylacetamide, N-methyl pyrrolidone, and N-ethyl pyrrolidone), and heterocyclic compounds (for example, pyridine), and water. These solvents may be used alone or in combination of two or more kinds thereof.

In a case where the coloring composition includes the solvent, the content of the solvent is preferably 80% to 99% by mass, more preferably 83% to 98% by mass, and even more preferably 85% to 96% by mass with respect to the total mass of the coloring composition.

As the interface improver, the interface improver described in the column of Examples described later can be used.

In a case where the coloring composition includes the interface improver, the content of the interface improver is preferably 0.001 to 5 parts by mass with respect to 100 parts by mass of the total of the dichroic dye compound and the liquid crystal compound in the coloring composition.

As the polymerizable component, a compound including acrylate (for example, acrylate monomer) may be exemplified. In this case, the light absorption anisotropic layer in the present invention includes polyacrylate obtained by polymerizing the compound including acrylate.

Examples of the polymerizable component include compounds described in paragraph 0058 of JP2017-122776A.

In a case where the coloring composition includes the polymerizable component, the content of the polymerizable component is preferably 3 to 20 parts by mass with respect to 100 parts by mass of the total of the dichroic dye compound and the liquid crystal compound in the coloring composition.

In a case of using the liquid crystal compound, for example, by utilizing a guest-host type liquid crystal cell technology, the molecules of the dichroic dye compound can be made in a desired alignment as described above while accompanying the alignment of the host liquid crystal. Specifically, the light absorption anisotropic layer in the present invention can be prepared by mixing the dichroic dye compound serving as a guest and the rod-like liquid crystal compound serving as a host liquid crystal, aligning the host liquid crystal, aligning the molecules of the dichroic dye compound along the alignment of the liquid crystal molecules, and fixing the alignment state.

In order to prevent fluctuation of light absorption properties of the light absorption anisotropic layer due to use environment in the present invention, the alignment of the dichroic dye compound is preferably fixed by forming a chemical bond. For example, the alignment can be fixed by advancing polymerization of the host liquid crystal, the dichroic dye compound, or a polymerizable component to be added, if desired.

In addition, a guest-host type liquid crystal cell having a liquid crystal layer including at least a dichroic dye compound and a host liquid crystal on a pair of substrates may be used as the light absorption anisotropic layer in the present invention. The alignment of the host liquid crystal (and the accompanying alignment of the molecules of the dichroic dye compound) can be controlled by an alignment film formed in the surface of the substrate, and unless an external stimulus such as an electric field is applied, the alignment state is maintained so that the light absorption properties of the light absorption anisotropic layer in the present invention can be fixed.

In addition, a polymer film satisfying the light absorption properties required for the light absorption anisotropic layer in the present invention can be prepared by penetrating a dichroic dye compound into a polymer film and aligning the dichroic dye compound along the alignment of the polymer molecule in the polymer film. Specifically, the polymer film can be prepared by applying a solution of a dichroic dye compound to the surface of the polymer film to penetrate the dichroic dye into the polymer film. The alignment of the dichroic dye compound can be adjusted by the alignment of a polymer chain in the polymer film and properties thereof (for example, chemical and physical properties of the polymer chain or a functional group which the polymer chain has, and the like), a coating method, and the like.

The details of this method are described in JP2002-090526A.

<Protective Layer>

The protective layer in the present invention is a layer that is arranged to be adjacent to the light absorption anisotropic layer and satisfies Expression (1).

In Expression (1), the value of "(nx+ny)/2−n" is within a range of −0.2 to 0.2, and from the viewpoint of suppressing the occurrence of internal reflection, the value is preferably within a range of −0.1 to 0.1, more preferably within a range of −0.08 to 0.08, and even more preferably within a range of −0.05 to 0.05.

As a specific example of the method satisfying Expression (1), as described above, there is a method of vertically aligning a dichroic dye compound with a high degree of alignment.

The value of n is preferably 1.40 to 1.60 and more preferably 1.45 to 1.55.

Specific examples of the protective layer in the present invention include a layer including a polyvinyl alcohol (PVA)-based resin, a layer formed by curing a composition having an acrylate monomer, and a layer including an epoxy resin. Among these, a layer including a polyvinyl alcohol (PVA)-based resin, and a layer formed by curing a composition having an acrylate monomer are preferable.

For the protective layer in the present invention, from the viewpoint of improving durability, the oxygen permeation coefficient is preferably 5 ccmm/m$^2$·day·atm or less, more preferably 3 ccmm/m$^2$·day·atm or less, and particularly preferably 2 ccmm/m$^2$·day·atm or less in an environment at 25° C. and 50% RH. By the oxygen permeation coefficient satisfying this value, in a case where a pressure sensitive adhesive layer is provided on a surface of the protective layer other than the surface on which the light absorption anisotropic layer is provided, diffusion of the pressure sensitive adhesive into the light absorption anisotropic layer is suppressed and thus the durability can be significantly improved.

For the protective layer in the present invention, from the viewpoint of being capable of improving the scratch resistance of the optical film, the Knoop hardness is preferably 160 N/mm$^2$ or more, more preferably 170 N/mm$^2$ or more, and particularly preferably 180 N/mm$^2$ or more.

From the viewpoint of further improving the durability and suppressing the generation of scratches, it is particularly preferable to use a polyfunctional acrylate monomer as the acrylate monomer. Examples of the polyfunctional acrylate monomer include ethylene glycol di(meth)acrylate, 1,4-cyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, and tricyclodecane dimethanol diacrylate.

<Alignment Film>

The optical film according to the embodiment of the present invention may have an alignment film between the transparent base material film and the light absorption anisotropic layer.

The alignment film may be any layer as long as the dichroic dye compound can be aligned on the alignment film in a desired alignment state.

The alignment film can be provided by means of means of rubbing treatment of an organic compound (preferably, polymer) to the film surface, oblique vapor deposition of an inorganic compound, formation of a layer having microgrooves, or a method of accumulation of an organic compound (for example, ω-tricosanoic acid, dioctadecyl methyl ammonium chloride, and methyl stearate) according to a Langmuir-Blodgett's technique (LB film). Further, also known is an alignment film that may have an alignment function through electric field application thereto, magnetic field application thereto or photoirradiation thereto. Among these, in the present invention, from the viewpoint of easy control of a pretilt angle of the alignment film, an alignment film formed by a rubbing treatment is preferable and from the viewpoint of uniformity of alignment, an optical alignment film formed by photoirradiation is preferable.

(Alignment Film by Rubbing Treatment)

Regarding the polymer material used for the alignment film formed by rubbing treatment, there are descriptions of numerous literatures and many commercially available products are available. In the present invention, a polyvinyl alcohol-based resin or polyimide, and derivatives thereof are preferably used. Regarding the alignment film, reference may be made to the description of WO2001/88574A1, from page 43, line 24 to page 49, line 8. The thickness of the alignment film is preferably 0.01 to 10 μm and more preferably 0.01 to 1 μm.

(Optical Alignment Film)

Regarding the optical alignment material used for the alignment film formed by photoirradiation, there are descriptions of numerous literatures. In the present invention, preferable examples thereof include azo compounds described in JP2006-285197A, JP2007-076839A, JP2007-138138A, JP2007-094071A, JP2007-121721A, JP2007-140465A, JP2007-156439A, JP2007-133184A, JP2009-109831A, JP3883848A, and JP4151746B, aromatic ester compounds described in JP2002-229039A, maleimide- and/or alkenyl-substituted nadiimide compounds having an optical alignment unit as described in JP2002-265541A and JP2002-317013A, photo-crosslinking silane derivatives described in JP4205195B and JP4205198B, and photo-crosslinking polyimides, polyamides or esters described in JP2003-520878A, JP2004-529220A, or JP4162850B. More preferable examples include azo compounds; and photo-crosslinking polyimide, polyamides and esters.

<Method of Producing Optical Film>

As an example of a method of producing the optical film according to the embodiment of the present invention, a method including a step of applying the coloring composition to the transparent base material film to form a coating film, a step of aligning a dichroic dye compound included in the coating film to obtain the light absorption anisotropic layer, and a step of forming the protective layer so as to be adjacent to the light absorption anisotropic layer in this order may be used.

Each step can be carried out according to a known method and is not particularly limited.

[Liquid Crystal Display Device]

A liquid crystal display device according to an embodiment of the present invention has the optical film, a polarizer, and a liquid crystal cell in this order. Hereinafter, the members constituting the liquid crystal display device will be described. The optical film is as described above and thus the description thereof will be omitted.

<Polarizer>

Examples of the polarizer include a light absorption anisotropic layer including a dichroic dye compound horizontally (in a direction crossing the thickness direction of the light absorbing anisotropic film) aligned without including a liquid crystal compound described in JP2010-152351A, and a light absorption anisotropic layer including a liquid crystal compound described in WO2017/154907A and a dichroic dye compound horizontally aligned.

The polarizer in the present invention may be introduced into the liquid crystal display device according to the embodiment of the present invention in the form of an optical film including a polarizer (hereinafter, also referred to as "another optical film"). In this case, examples of layers in another optical film other than the polarizer include an alignment film described in JP2010-152351 IA, a pressure sensitive adhesive layer, and a protective layer, and the lamination order of each layer (film) may be the same.

The optical film according to the embodiment of the present invention and the polarizer may be laminated through a known adhesive layer or pressure sensitive adhesive layer. In the same manner, the polarizer and the liquid crystal cell may be laminated through an adhesive layer or a pressure sensitive adhesive layer.

<Liquid Crystal Cell>

The liquid crystal cell for use in the liquid crystal display device according to the embodiment of the present invention is preferably of a vertical alignment (VA) mode, an optically compensated bend (OCB) mode, an in-plane-switching (IPS) mode or a twisted nematic (TN) mode but the cell mode is not limited thereto.

In a TN mode liquid crystal cell, rod-like liquid crystal molecules are aligned substantially horizontally in a case in which no voltage is applied and are further aligned in a twisted manner in a range of 60° to 120°. The TN mode liquid crystal cell is most often used in a color TFT liquid crystal display device and is mentioned in numerous literatures.

In a VA mode liquid crystal cell, rod-like liquid crystal molecules are aligned substantially vertically in a case in which no voltage is applied. Examples of the VA mode liquid crystal cells include (1) a narrowly defined VA mode liquid crystal cell (described in JP1990-176625A (JP-H02-176625A)) in which rod-like liquid crystal molecules are aligned substantially vertically in a case in which no voltage is applied and are aligned substantially horizontally in a case in which a voltage is applied, (2) a multi-domain VA mode (MVA mode) liquid crystal cell for enlarging the viewing angle (SID97, Digest of Tech. Papers (Proceedings) 28 (1997) 845), (3) a liquid crystal cell in a mode (n-ASM mode) in which rod-like liquid crystal molecules are aligned substantially vertically in a case in which no voltage is applied and are aligned in twisted multi-domain alignment in a case in which a voltage is applied (Proceedings of Japanese Liquid Crystal Conference, 58 and 59 (1998)), and (4) a SURVIVAL mode liquid crystal cell (presented in LCD International 98). The liquid crystal cell may be of any of a patterned vertical alignment (PVA) type, an optical alignment type, and a polymer-sustained alignment (PSA) type. These modes are described in detail in JP2006-215326A and JP2008-538819A.

In an IPS mode liquid crystal cell, a liquid crystal compound is aligned substantially parallel with respect to a substrate and application of an electric field parallel to the substrate surface causes the liquid crystal molecules to respond planarly. That is, a liquid crystal compound is planarly aligned in a state in which no electric field is applied. The IPS mode displays black in a state in which no electric field is applied and a pair of upper and lower polarizing plates have absorption axes which are orthogonal to each other. A method of improving the viewing angle by reducing light leakage during black display in an oblique direction using an optical compensation sheet is described in JP1998-54982A (JP-H10-54982A), JP1999-202323A (JP-H11-202323A), JP1997-292522A (JP-H09-292522A), JP1999-133408A (JP-H11-133408A), JP1999-305217A (JP-H11-305217A), JP1998-307291A (JP-H10-307291A), and the like.

EXAMPLES

Hereinafter, the present invention will be described more specifically using examples. The materials, reagents, amounts and ratios of substances, operations, and the like shown in the examples below can be modified as appropriate without departing from the spirit of the present invention. The scope of the present invention is, therefore, not limited to the examples described below.

<Preparation of Alignment Film>
(1) Preparation of Alignment Film
A commercially available cellulose acylate-based film, trade name "FUJITAC TG40UL" (manufactured by Fujifilm Corporation), was prepared as a transparent base material film, and the surface was hydrophilized through saponification treatment. Then, the following alignment film forming composition 1 was applied to the surface using a #12 bar, and dried at 110° C. for 2 minutes to form an alignment film 1 on the transparent base material film.

(Composition of Alignment Film Forming Composition 1)

| | |
|---|---|
| Modified polyvinyl alcohol below | 2.00 parts by mass |
| Water | 74.08 parts by mass |
| Methanol | 23.76 parts by mass |
| Photopolymerization initiator (IRGACURE 2959, manufactured by BASF) | 0.06 parts by mass |

(Modified polyvinyl alcohol)

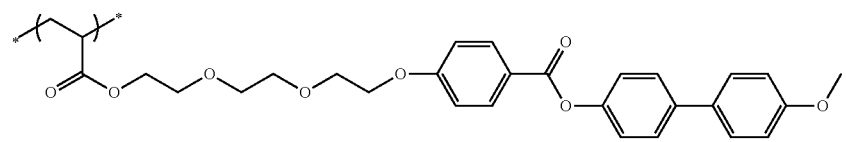

(in the formula, the numerical value attached to the repeating unit represents the molar ratio of each repeating unit.)

<Preparation of Light Absorption Anisotropic Layer>
(1) Preparation of Light Absorption Anisotropic Layer 1
The following coloring composition 1 was applied to the obtained alignment film by spin coating at 1000 revolutions and thus a coating film was formed. The coating film was dried at room temperature for 30 seconds, then heated to 140° C., and retained at 30 seconds. The coating film was then cooled to room temperature. Next, the coating film was heated again to 80° C. for 30 seconds and then cooled to room temperature. The layer prepared in this manner was used as a light absorption anisotropic layer 1.

(Composition of Coloring Composition 1)

| | |
|---|---|
| Dichroic dye compound D1 | 9.63 parts by mass |
| Dichroic dye compound D2 | 7.92 parts by mass |
| Polymer liquid crystal compound P1 | 40.11 parts by mass |
| Interface improver F1 | 0.73 parts by mass |
| Interface improver F2 | 0.73 parts by mass |
| Interface improver F3 | 0.87 parts by mass |
| Tetrahydrofuran | 799.0 parts by mass |
| Cyclopentanone | 141.0 parts by mass |

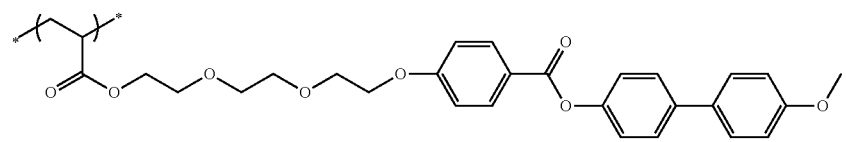

P1

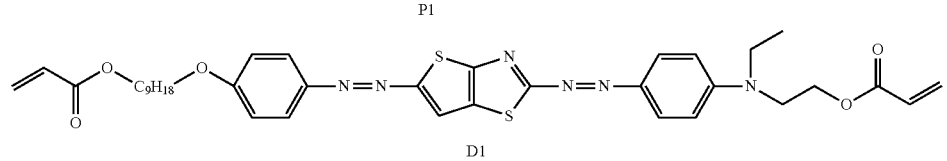

D1

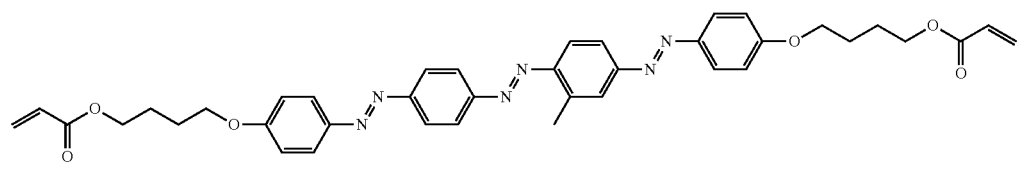

D2

-continued

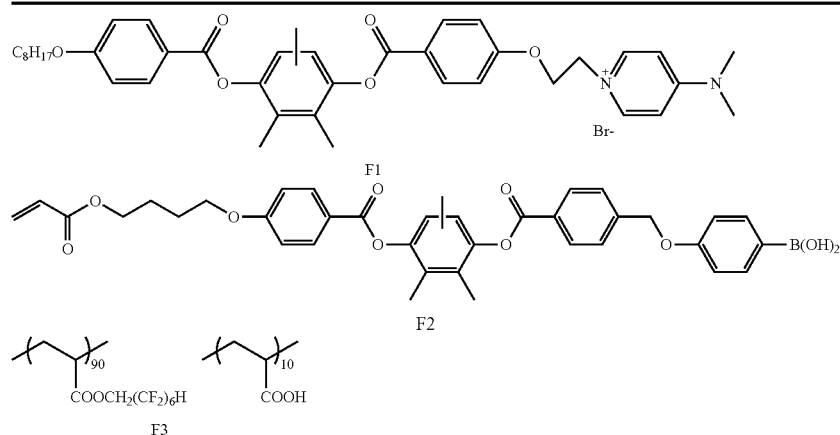

(2) Preparation of Light Absorption Anisotropic Layer 2

A light absorption anisotropic layer 2 was prepared using the same manner as in the preparation of the light absorption anisotropic layer 1 except that the heating temperature after drying was changed to 135° C.

(3) Preparation of Light Absorption Anisotropic Layer 3

A light absorption anisotropic layer 3 was prepared using the same manner as in the preparation of the light absorption anisotropic layer 1 except that the coloring composition 1 was changed to a coloring composition 2.

(Composition of Coloring Composition 2)

| | |
|---|---|
| Dichroic dye compound D1 | 9.76 parts by mass |
| Dichroic dye compound D2 | 8.03 parts by mass |
| Polymer liquid crystal compound P1 | 40.65 parts by mass |
| Interface improver F1 | 0.49 parts by mass |
| Interface improver F2 | 0.49 parts by mass |
| Interface improver F3 | 0.58 parts by mass |
| Tetrahydrofuran | 799.0 parts by mass |
| Cyclopentanone | 141.0 parts by mass |

(4) Preparation of Light Absorption Anisotropic Layer 4

A light absorption anisotropic layer 4 was prepared using the same manner as in the preparation of the light absorption anisotropic layer 1 except that the coloring composition 1 was changed to a coloring composition 3.

(Composition of Coloring Composition 3)

| | |
|---|---|
| Dichroic dye compound D1 | 9.87 parts by mass |
| Dichroic dye compound D2 | 8.12 parts by mass |
| Polymer liquid crystal compound P1 | 41.13 parts by mass |
| Interface improver F3 | 0.87 parts by mass |
| Tetrahydrofuran | 799.0 parts by mass |
| Cyclopentanone | 141.0 parts by mass |

(5) Preparation of Light Absorption Anisotropic Layer 5

A light absorption anisotropic layer 5 was prepared using the same manner as in the preparation of the light absorption anisotropic layer 1 except that the coloring composition 1 was changed to a coloring composition 4.

(Composition of Coloring Composition 4)

| | |
|---|---|
| Dichroic dye compound D1 | 17.33 parts by mass |
| Dichroic dye compound D2 | 14.26 parts by mass |
| Polymer liquid crystal compound P1 | 26.07 parts by mass |
| Interface improver F1 | 0.73 parts by mass |
| Interface improver F2 | 0.73 parts by mass |
| Interface improver F3 | 0.87 parts by mass |
| Tetrahydrofuran | 799.0 parts by mass |
| Cyclopentanone | 141.0 parts by mass |

(6) Preparation of Light Absorption Anisotropic Layer 6

A light absorption anisotropic layer 6 was prepared using the same manner as in the preparation of the light absorption anisotropic layer 1 except that the coloring composition 1 was changed to a coloring composition 5.

(Composition of Coloring Composition 5)

| | |
|---|---|
| Dichroic dye compound D1 | 17.77 parts by mass |
| Dichroic dye compound D2 | 14.62 parts by mass |
| Polymer liquid crystal compound P1 | 26.74 parts by mass |
| Interface improver F3 | 0.87 parts by mass |
| Tetrahydrofuran | 799.0 parts by mass |
| Cyclopentanone | 141.0 parts by mass |

(7) Preparation of Light Absorption Anisotropic Layer 7

The following coloring composition 6 was applied to an unstretched amorphous polyolefin film (ZEONOA, manufactured by ZEON CORPORATION, thickness: 100 μm), the solvent was evaporated by heating at 50° C., and thus a liquid crystal monomer layer was formed. The liquid crystal monomer layer was further heated at 80° C. and the state of the liquid crystal monomer layer is set in an isotropic state. Then, the liquid crystal monomer was polymerized by irradiation with ultraviolet rays at 300 mJ/m² in a state in which a 1 kV direct current electric field was applied in a direction tilted 20° to the normal to the film surface, while being gradually cooled, and thus the liquid crystal monomer was completely cured. The layer prepared in this manner was used as a light absorption anisotropic layer 7 and was set to Sample No. 13.

(Composition of Coloring Composition 6)

A mixture in which the following [6-1] and [6-2] were mixed at a ratio of 4:1 was used as the coloring composition 6.

[6-1]

| | |
|---|---|
| Monofunctional thermotropic cyanobiphenyl based nematic liquid crystal monomer having polymerizable group at terminal | 100.00 parts by mass |
| Polymer lipid crystal compound A | 25.00 parts by mass |
| 4-methyl-2-pentanone | 400.00 parts by mass |
| IRGACURE 907 | 5 parts by mass |
| Cyclopentanone | 100.0 parts by mass |
| Polyazo-based dye having an absorption peak at wavelength of 458 nm | 1.50 parts by mass |
| Polyazo-based dye having an absorption peak at wavelength of 542 nm | 0.80 parts by mass |
| Polyazo-based dye having an absorption peak at wavelength of 621 nm | 1.00 part by mass |

| | |
|---|---|
| A-DCP | 979.8 parts by mass |
| IRGACURE 127 | 20.0 parts by mass |
| Interface improver F3 | 0.2 parts by mass |

(3) Preparation of Protective Layer Forming Coating Composition 3

A protective layer forming coating composition 3 was prepared by mixing each component at the following composition.

(Composition of Protective Layer Forming Coating Composition 3)

| | |
|---|---|
| A-TMMT | 979.8 parts by mass |
| IRGACURE 127 | 20.0 parts by mass |
| Interface improver F3 | 0.2 parts by mass |

(4) Preparation of Protective Layer Forming Coating Composition 4

A protective layer forming coating composition 4 was prepared by mixing each component at the following composition.

(Composition of Protective Layer Forming Coating Composition 4)

| | |
|---|---|
| BPE-500 | 979.8 parts by mass |
| IRGACURE 127 | 20.0 parts by mass |
| Interface improver F3 | 0.2 parts by mass |

The details of the components used are shown below.
A-DCP: tricyclodecane dimethanol diacrylate (manufactured by Shin Nakamura. Chemical Co., Ltd.)
A-TMMT: pentaerythritol tetraacrylate (manufactured by Shin Nakamura Chemical Co., Ltd.)
BPE-500: ethoxylated bisphenol A dimethacrylate (manufactured by Shin Nakamura Chemical Co., Ltd.)
IRGACURE 127: 2-hydroxy-1-{4-[4-(2-hydroxy-2-methyl-propionyl)-benzyl]phenyl}-2-methyl-propanone-1-one (manufactured by BASF)
IRGACURE 907: 2-methyl-1-(4-methylthio phenyl)-2-morpholino propanone-1-one (manufactured by BASF)
Polymer liquid crystal compound A: polymer liquid crystal compound having the following structure (manufactured by KUROGANE KASEI Co., Ltd.)

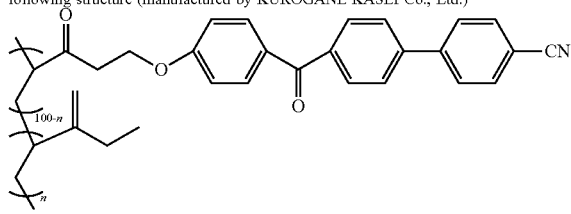

<Coating of Protective Layer>

The protective layer forming coating composition was applied to the light absorption anisotropic layer by spin coating at 3000 revolutions and thus a protective layer was applied such that the protective layer and the light absorption anisotropic layer were adjacent to each other. Then, the protective layer was cured through irradiation with ultraviolet rays at an illuminance of 200 mW/cm² and an irradiation dose of 300 mJ/cm² using a 160 W/cm air-cooled metal halide lamp (manufactured by EYE GRAPHICS CO., LTD.).

The alignment film, the light absorption anisotropic layer, and the protective layer were combined as shown in Table 1 to prepare Sample (optical films) Nos. 1 to 12. Regarding Sample No. 12 using no alignment film, the light absorption anisotropic layer was applied to the saponified "FUJITAC TG40UL". In addition, in Sample (optical film) No. 13, the results as shown in Table 1 were obtained.

<Performance Evaluation>

(1) Evaluation of Degree of Vertical Alignment and Front Transmittance

The obtained optical films were used and the Mueller matrix of the light absorption anisotropic layer at a wavelength λ was measured using AxoScan OPMF-1 (manufactured by Opto Science, Inc.) at a polar angle of −50° to 50° with an interval of 10°. After removing the influence of the surface reflection, ko[λ] and ke[λ] were calculated by fitting the data in a following theoretical expression in consideration of the Snell's law and the Fresnel's equation.

Unless otherwise specified, the wavelength λ was set to 550 nm.

$$k=-\log(T)\times\lambda/(4\pi d)$$

By using the obtained ko[λ] and ke[λ], the absorbance and the dichroic ratio in the in-plane direction and the thickness direction were calculated and finally, the degree of vertical alignment was obtained.

In addition, the measurement result at a polar angle of 0° at which the influence of the surface reflection was removed was used as the front transmittance, and further, as the value of Tmin at a polar angle of 60°, the value obtained from this evaluation was used.

(2) Light Resistance Test

In a state in which the protective layer or the light absorption anisotropic layer of the obtained optical film was laminated on glass using a pressure sensitive adhesive, using a super Xenon tester SX75 (manufactured by Suga Test Co., Ltd.), the laminate was irradiated with xenon (Xe) for 150 hours. Based on the change rate in front transmittance before and after the irradiation, the light resistance was evaluated.

A: The change in front transmittance was less than 2%.
B: The change in front transmittance was 2% or more and less than 15%.
C: The change in front transmittance was 15% or more.

(3) Durability Test

In a state in which the protective layer or the light absorption anisotropic layer of the obtained optical film was laminated on glass using a pressure sensitive adhesive, the durability test was carried out at 65° C. and 90% RH for 500 hours. Based on the front transmittance before and after the durability test, the durability was evaluated.

A: The change in front transmittance was less than 2%.
B: The change in front transmittance was 2% or more and less than 15%.
C: The change in front transmittance was 15% or more.

(4) Steel Wool Scratch Resistance (SW Scratch Resistance)

A rubbing test was conducted on the surface opposite to the transparent base material film with a rubbing tester under the following conditions.

Evaluation environment conditions: 25° C., 60% RH

Rubbing material:steel wool (Grade No. 0000, (manufactured by Nippon Steel Wool Co., Ltd.))

The film was wound on a rubbing point portion (1 cm×1 cm) of a tester bringing into contact with the sample and fixed with a band.

Moving distance (one way): 13 cm
Rubbing speed: 13 cm/sec
Load: 100 g/cm$^2$
Point portion contact area: 1 cm×1 cm
Rubbing number: 10 reciprocations An oily black ink was applied on the rear surface of the rubbed sample, scratches on the rubbed portion were visually observed under reflected light, and evaluation was performed according to the following standards. Practically, a level higher than B rank is required.

A: Scratches are not seen at all even if observed very carefully.

B: Weak scratches are observed.

C: There are scratches which may be found by only one glance.

(5) Oxygen Permeation Coefficient

The oxygen permeation coefficient was measured under the following conditions. In addition, the oxygen permeation coefficient of the protective layer alone was calculated by calculation from two measurement values of the completed optical film and the film corresponding to the optical film before forming the protective layer.

Test Method:ISO 15105-2 (Equal Pressure Method)

Tester: automated oxygen permeability tester obtained by partially improving an oxygen concentration meter Model 3600, manufactured by Hach Ultra Analytics, Inc., (manufactured by MOCON, Inc. detection and calibration by an oxygen permeability tester OX-TRAN 2/10 type)

Test temperature: 25° C.
Test humidity:relative humidity 50% RH
Test gas:air (oxygen content)

(6) Refractive Index

Using a spectroscopic ellipsometer M-2000U manufactured by J. A. Woollam, measurement was carried out at an incidence angle of 500 to 700. The refractive index of the light absorption anisotropic layer of each sample was obtained by measuring the film in a state in which the protective layer was not formed. The optical constant of the alignment film was analyzed by the Cauchy's dielectric function model. Assuming uniaxial anisotropy, a solution simultaneously satisfying the measured spectrum of each angle was obtained by the dielectric function model in which Gaussian absorption (5 pieces) was assumed, and wavelength dependency data at 400 nm to 750 nm in each direction was calculated. In these data, the average values at all wavelengths in each direction were set to nx, ny, and nz, respectively.

The refractive index of the protective layer was obtained by directly applying the protective layer to the alignment film and measuring the refractive index. The refractive index of the protective layer was isotropic and was set to n.

(7) Internal Reflectivity

After the surface opposite to the transparent base material film was roughened with sandpaper and treated with black ink, in a state in which reflection on the back surface was removed, the integrated spectral reflectivity on the transparent base material film side was measured in the wavelength range of 380 nm to 780 nm at an incident angle of 5° using a spectrophotometer (manufactured by JASCO Corporation). As the result, the arithmetic average value of the integrated reflectivity at 400 to 750 nm was used. This measurement was applied to the optical film according to the embodiment of the present invention and also applied to the transparent base material film alone in the same manner. The difference in reflectivity was used as internal reflectivity.

(8) Knoop Hardness

The Knoop hardness in the present invention is an average value obtained by performing measurement 10 times on the protective layer of the obtained optical film under the following conditions.

[Measurement device] Microhardness tester: FISCHER-SCOPE HM 2000 (manufactured by Fischer Instruments K.K.)

[Loading time] 10 seconds
[Indentation load] 50 mN

TABLE 1

| Sample No. | Alignment film | Light absorption anisotropic layer | Protective layer | Refractive index of light absorption anisotropic layer | | | Refractive index of protective layer | (nx + ny)/2 − n | Oxygen permeation coefficient of protective layer (ccmm/m2 · day · atm) | Degree of vertical alignment |
|---|---|---|---|---|---|---|---|---|---|---|
| | | | | nx | ny | nz | n | | | |
| 1 | Alignment film 1 | Light absorption anisotropic layer 1 | Protective layer 1 | 1.55 | 1.55 | 1.90 | 1.50 | 0.05 | 0.6 | 0.92 |
| 2 | Alignment film 1 | Light absorption anisotropic layer 1 | None | 1.55 | 1.55 | 1.90 | — | — | — | 0.92 |
| 3 | Alignment film 1 | Light absorption anisotropic layer 1 | Protective layer 2 | 1.55 | 1.55 | 1.90 | 1.55 | 0 | 1.7 | 0.92 |
| 4 | Alignment film 1 | Light absorption anisotropic layer 1 | Protective layer 3 | 1.55 | 1.55 | 1.90 | 1.52 | 0.03 | 0.5 | 0.92 |
| 5 | Alignment film 1 | Light absorption anisotropic layer 1 | Protective layer 4 | 1.55 | 1.55 | 1.90 | 1.52 | 0.03 | 8 | 0.92 |
| 6 | Alignment film 1 | Light absorption anisotropic layer 2 | Protective layer 2 | 1.58 | 1.58 | 1.85 | 1.55 | 0.03 | 1.7 | 0.84 |
| 7 | Alignment film 1 | Light absorption anisotropic layer 3 | Protective layer 2 | 1.60 | 1.60 | 1.80 | 1.55 | 0.05 | 1.7 | 0.76 |
| 8 | Alignment film 1 | Light absorption anisotropic layer 4 | Protective layer 2 | 1.68 | 1.68 | 1.68 | 1.55 | 0.13 | 1.7 | — |
| 9 | Alignment film 1 | Light absorption anisotropic layer 4 | None | 1.68 | 1.68 | 1.68 | — | — | — | — |
| 10 | Alignment film 1 | Light absorption anisotropic layer 5 | Protective layer 2 | 1.60 | 1.60 | 2.20 | 1.55 | 0.05 | 1.7 | 0.92 |

TABLE 1-continued

| 11 | Alignment film 1 | Light absorption anisotropic layer 6 | Protective layer 2 | 1.80 | 1.80 | 1.80 | 1.55 | 0.25 | 1.7 | — |
| 12 | None | Light absorption anisotropic layer 1 | Protective layer 2 | 1.55 | 1.55 | 1.90 | 1.55 | 0 | 1.7 | 0.92 |
| 13 | None | Light absorption anisotropic layer 7 | None | — | — | — | — | — | — | — |

| Sample No. | Front transmittance | Polar angle 60° Tmin | Knoop hardness of protective layer (N/mm2) | Light resistance | Durability | SW scratch resistance | Internal reflectivity | |
|---|---|---|---|---|---|---|---|---|
| 1 | 95% | 46% | 175 | A | A | B | 0.2% | Example |
| 2 | 95% | 46% | — | B | C | C | 0.2% | Comparative Example |
| 3 | 95% | 46% | 190 | A | A | A | 0.2% | Example |
| 4 | 95% | 46% | 400 | A | A | A | 0.2% | Example |
| 5 | 95% | 46% | 150 | B | B | B | 0.2% | Example |
| 6 | 91% | 45% | 190 | A | A | A | 0.2% | Example |
| 7 | 87% | 44% | 190 | B | A | A | 0.3% | Example |
| 8 | 45% | 20% | 190 | C | A | A | 0.6% | Comparative Example |
| 9 | 45% | 20% | — | C | C | C | 0.6% | Comparative Example |
| 10 | 90% | 30% | 190 | A | A | A | 0.3% | Example |
| 11 | 20% | 9% | 190 | C | A | A | 1.4% | Comparative Example |
| 12 | 95% | 46% | 190 | A | A | A | 0.2% | Example |
| 13 | — | — | — | C | C | C | 1.3% | Comparative Example |

From the results, it is found that in the optical films using the light absorption anisotropic layers 1 to 3 and 5, the front transmittance is high, but the transmittance at 60° is significantly reduced. It is considered that this is because, since the dichroic dye compound is vertically aligned along the film thickness, light in the front is transmitted while light in the oblique direction is absorbed. In the optical films using the light absorption anisotropic layers 4 and 6, although the transmittance at 60° is low, this is because the front transmittance is basically low and the transmittance is reduced by the optical path length viewed from an oblique direction. The optical films do not match the purpose of further reducing the transmittance in the oblique direction.

In addition, as in Sample Nos. 3, 6, 7 and 10 for Sample Nos. 8 and 11, in a case where the value of nz for the values of nx and ny is high and the liquid crystal compound is vertically aligned, it is found that the light resistance is improved. It is considered that this is because, since the liquid crystal compound is vertically aligned and the front transmittance becomes high, light absorption during the light resistance test is reduced.

Further, as in Sample No. 1 for Sample No. 2, it is found that by providing the protective layer on the surface, the durability can be significantly improved. It is considered that this is because, in a case where the light absorption anisotropic layer is in direct contact with the pressure sensitive adhesive, the diffusion of the substance occurs between the light absorption anisotropic layer and the pressure sensitive adhesive to cause deterioration in the performance, but the diffusion can be suppressed by forming the protective layer.

What is claimed is:

1. An optical film comprising:
   a light absorption anisotropic layer having at least one dichroic dye compound; and
   a protective layer that is adjacent to the light absorption anisotropic layer,
   wherein the light absorption anisotropic layer and the protective layer satisfy Expressions (1) to (4), $-0.2 \leq (nx+ny)/2 - n \leq 0.2$ (1)
   $nz > 1.7$ (2)
   $nz > nx$ (3)
   $nz > ny$ (4)

in the expressions, n represents a refractive index of the protective layer, nx represents a refractive index in a plane of the light absorption anisotropic layer in a refractive index maximum direction, ny represents a refractive index in the plane of the light absorption anisotropic layer in a direction orthogonal to nx, and nz represents a refractive index in a thickness direction of the light absorption anisotropic layer.

2. The optical film according to claim 1,
   wherein the nz is 1.85 or more.

3. The optical film according to claim 2,
   wherein the protective layer includes a polyvinyl alcohol-based resin.

4. The optical film according to claim 3,
   wherein the protective layer has an oxygen permeation coefficient of 5 ccmm/m$^2$·day·atm or less.

5. The optical film according to claim 2,
   wherein the protective layer is a layer formed by curing a composition having an acrylate monomer.

6. The optical film according to claim 2,
   wherein the protective layer has an oxygen permeation coefficient of 5 ccmm/m$^2$·day·atm or less.

7. The optical film according to claim 1,
   wherein the protective layer includes a polyvinyl alcohol-based resin.

8. The optical film according to claim 7,
   wherein the protective layer has an oxygen permeation coefficient of 5 ccmm/m$^2$·day·atm or less.

9. The optical film according to claim 1,
   wherein the protective layer is a layer formed by curing a composition having an acrylate monomer.

10. The optical film according to claim 9,
    wherein the protective layer has an oxygen permeation coefficient of 5 ccmm/m$^2$·day·atm or less.

11. The optical film according to claim 1,
wherein the protective layer has an oxygen permeation coefficient of 5 ccmm/m²·day·atm or less.
12. The optical film according to claim 1,
wherein the protective layer has a Knoop hardness of 160 N/mm² or more.
13. The optical film according to claim 1, further comprising:
a transparent base material film on a side of the light absorption anisotropic layer opposite to the protective layer.
14. The optical film according to claim 13,
wherein the transparent base material film is a cellulose acylate film.
15. The optical film according to claim 13, further comprising:
an alignment film between the transparent base material film and the light absorption anisotropic layer.
16. The optical film according to claim 15,
wherein the alignment film includes a polyvinyl alcohol-based resin.
17. The optical film according to claim 1,
wherein the light absorption anisotropic layer includes a polymer liquid crystal compound.
18. The optical film according to claim 17,
wherein the polymer liquid crystal compound forms a nematic liquid crystalline phase.
19. The optical film according to claim 1,
wherein the light absorption anisotropic layer is a layer obtained by using a composition including a compound containing an acrylate.
20. A liquid crystal display device comprising, in order:
the optical film according to claim 1;
a polarizer; and
a liquid crystal cell.

* * * * *